United States Patent

Wettlaufer

[11] Patent Number: 6,159,527
[45] Date of Patent: Dec. 12, 2000

[54] METHOD AND APPARATUS FOR INFUSING FRUIT

[76] Inventor: Dale E. Wettlaufer, 842 Oakwood Ave., East Aurora, N.Y.

[21] Appl. No.: 09/230,024
[22] PCT Filed: Jul. 18, 1997
[86] PCT No.: PCT/US97/12508
§ 371 Date: Jan. 15, 1999
§ 102(e) Date: Jan. 15, 1999
[87] PCT Pub. No.: WO98/03072
PCT Pub. Date: Jan. 29, 1998

Related U.S. Application Data

[60] Provisional application No. 60/022,190, Jul. 19, 1996, and provisional application No. 60/032,490, Dec. 18, 1996.

[51] Int. Cl.$^7$ .............................. A23B 7/08; A23B 7/158
[52] U.S. Cl. ......................... 426/639; 426/293; 426/310; 426/425; 426/426; 426/429; 426/489; 426/573; 426/577; 426/615; 426/658; 99/487; 99/516
[58] Field of Search ...................................... 426/293, 310, 426/425, 426, 429, 489, 573, 577, 615, 639, 658; 99/487, 516

[56] References Cited

U.S. PATENT DOCUMENTS

| | | |
|---|---|---|
| 1,534,050 | 4/1925 | Barrielle . |
| 1,717,258 | 6/1929 | Rambaud . |
| 1,906,295 | 5/1933 | Wickenden . |
| 2,785,071 | 3/1957 | Mathews . |
| 3,032,419 | 5/1962 | Limpert . |
| 4,350,711 | 9/1982 | Kahn et al. . |
| 4,626,434 | 12/1986 | O'Mahony et al. . |
| 4,713,252 | 12/1987 | Ishmail . |
| 4,892,665 | 1/1990 | Wettlaufer . |
| 5,275,097 | 1/1994 | Wettlaufer . |
| 5,320,861 | 6/1994 | Mantius et al. . |

OTHER PUBLICATIONS

John T. Nickerson & Anthony J. Sinskey Microbiology of Foods and Food Processing 1972, pp. 71–83, American Elsevier Publishing Company, New York NY.

*Primary Examiner*—Helen Pratt
*Attorney, Agent, or Firm*—John C. Thompson

[57] ABSTRACT

Method and apparatus for infusing fruits (which may include vegetables) with sugar. The apparatus includes a series of interconnected tanks (10, 12, 14 and 16). A stratified column of infusing liquor is caused to flow from a tank (50) via variable output pump (52) through fruit which is placed within the tanks to cause the fruit to become saturated with sugar. In addition, the fruit is placed in a plumping liquid in the tanks prior to infusing and the infusing liquor will drive the plumping liquid in front of it. The fruit may be conditioned in various ways prior to placement in the tanks, which conditioning may remove fruit juice from the fruit, the fruit juice being collected in a tank (36) for subsequent use. Alternatively, if fruit juice is not removed from the fruit during a conditioning process, fruit juice is extracted from the downstream portion of the plumping liquid.

18 Claims, 4 Drawing Sheets

METHOD AND APPARATUS FOR INFUSING FRUIT

This application claims the benefit of U.S. Provisional application Ser. No. 60/022,190 filed Jul. 19, 1996 and 60/032,490 filed Dec. 18, 1996.

TECHNICAL FIELD

The present invention relates generally to a method and apparatus for infusing fruit, and more particularly to such a method and apparatus wherein there is a substantial juice byproduct and the fruit does not appear to have been dehydrated during processing, the fruit having the characteristics of juiciness and sweetness.

BACKGROUND OF THE INVENTION

U.S. Pat. No. 4,626,434, assigned to Rich Products, relates to a single step process for infusing fruit. In this process the fruit is placed into a 70% fructose syrup bath maintained at a temperature of approximately 65–71° C. (150–160° F.). (It is possible to use sucrose, which is a disaccharide consisting of fructose and glucose chemically bonded together. During processing the sucrose will be "inverted", i.e., the bond will be shattered and the sucrose will end up as fructose and glucose.) In the sugar syrup bath a portion of the fruit juice (water and aromatics) within the fruit will pass through the outer membranes of the fruit osmotically, and as the water tends to dilute the sugar syrup, the sugar syrup will be maintained at or near its initial sugar percentage by introducing concentrated sugar syrups. During this time equal amounts of diluted syrup are withdrawn and subsequently treated, the final byproduct being a sugar syrup which is reintroduced into the bath. The disadvantage of the Rich Products process is that the water goes out of the fruit faster than the sugar goes in, causing osmotic dehydration of the fruit. Once the fruit is osmotically dehydrated, it cannot be "plumped up," i.e., re-infused with a plumping liquid so that it does not appear to be dehydrated. In addition, there are no juice by-products. The juice is irretrievably mixed with the syrup.

U.S. Pat. No. 5,320,861, assigned to Ocean Spray, discloses a two step process for infusing fruit. In the first step a decharacterized fruit product is produced by a countercurrent "leaching" process. In the countercurrent process up to 94% of the fruit juice content is extracted and is replaced by water. This process does not cause osmotic dehydration as the osmotic transfer rates of the water and fruit juices are substantially the same. The decharacterized fruit is substantially nothing more than cellulose and water. The byproduct of this process is 3% fruit juice, which can be changed by evaporation to 8%. The second step of the process also uses a countercurrent process, the apparatus being substantially identical to that used in the first step of the process. During the second step an aqueous blend (or liquor) of sucrose and cranberry fruit juice components (or other equivalent fruit components) is used to infuse the decharacterized fruit. In addition, fruit flavorings and food colorings must be added to the infusing liquor used in the second step of the process in order to make the infused fruit resemble a cranberry. The result is a new fruit product in the way of infused cranberry having the sweetened flavor of the infusing liquor and cranberry juice. The resultant fruit product is dried and optimally has a sugar to water by weight ratio of about 70%. This sugar to water weight ratio is commonly referred to as Brix in the industry, and this term will be used in the remained of this specification. The disadvantage of this process is that the augers used by the countercurrent process is rough on soft or fragile fruit, causing too many undesirable fines. In addition, as water is extracted from the cranberries during the second step, the water will dilute the infusing liquor, and the augers cause mixing of dilute infusing liquor with the initial concentrated infusing liquor.

U.S. Pat. No. 2,785,071 to Mathews teaches infusing previously extracted fruit by moving a sugar front through the previously extracted fruit, the front having a sugar content beginning at zero and increasing in sugar content as the front is passed by the layers of fruit. In order to properly infuse the fruit according to the Mathews patent, a pretreatment process must be followed to prepare the fruit for infusing. The fruit must be soaked in a solution bath of ¼ to 1% of sulfur dioxide brine. The brine acts as a preservative for the fruit. Next, the fruit is boiled in order to volatilize the sulfur dioxide from the fruit. Boiling also cooks the fruit, tenderizes the fruit, and loosens the fibrous material. The fruit is next washed, diced, and washed again. The fruit now needs to be dyed in order to have any color. The infusion portion of the process disclosed in Mathews is a sequential batch process and is illustrated best in FIG. 1 of the Mathews patent. In the infusion process tanks 6, 7, & 8 are filled with the fruit to be processed, and a front of sugar heated to 49–60° C. (120–140° F.) is initially introduced into the base of tank 6, the sugar initially having a high sugar content. As the front of sugar syrup moves up though tank 6, it will be diluted by the water in the fruit cells of the fruit within the tank in a manner similar to that disclosed in the Rich patent. As the sugar front initially passes through conduit 21 it will have only a slightly higher sugar percentage than that of the fruit through which it has passed. (The initial tank will have fruit which suffers from osmotic dehydration.) As the front of sugar moves up through tank 7 the succeeding fronts of sugar increase in Brix content, and the fruit product will be sweetened. The Mathews patent sweetens the fruit to 77 Brix. A disadvantage of the process is in the pretreatment necessary to prepare it for impregnation with syrup. Thus the fruit is boiled and washed several times, which ruins the flavor of the fruit. In addition, the high temperatures recommended for both pretreatment and infusing turn the fruit mushy and will discolor some fruits, such as cranberries and strawberries. Furthermore, since virtually all the juice of the fruit is washed out during pretreatment, there is no possibility of extracting fruit juice. In addition, this process is not feasible for soft, previously frozen fruit.

OBJECTS AND SUMMARY OF THE INVENTION

It is an object of the present invention to provide a method and apparatus which overcomes the disadvantages of prior processes.

More particularly, it is an object of the present invention to provide a method and apparatus for infusing fruit which will produce an infused fruit having the characteristics of juiciness and sweetness.

A further object of the present invention is to extract juice and infuse sugar into a fruit in one step, while still producing a substantially pure juice product.

It is a further object of the present invention to process fruit to be infused with sugar at temperatures which do not exceed 38° C. (100° F.), and which preferably may be carried out at temperatures at or below room temperature.

It is a further object of the present invention to infuse fruit gently with no stirring or agitation, so that soft, fragile and/or previously frozen fruit may be processed.

A still further object of the present invention is to reduce the need for use of evaporators to recycle and reuse infusing liquor.

It is yet a further object of the present invention to infuse fruit without using preservatives and without losing much of the natural aromatics contained within raw fruit.

These and other objects and advantages of this invention will be apparent to one having ordinary skill in the art after a consideration of the following detailed description taken in conjunction with the accompanying drawings.

DETAILED DESCRIPTION IN GENERAL

In this invention, fruit is infused with sugar by flowing an infusing liquor containing dissolved sugar and fruit juice through the processed fruit. The infusing liquor has strata of progressively higher concentrations of sugar. The flow rate is controlled so that the strata with the progressively higher concentrations of sugar only just slightly exceeds the sugar content of the fruit being infused. Thus, the infusing is done at a rate slow enough so that as fruit juice leaves the fruit it will be replaced with sugar during an osmotic transfer without causing osmotic dehydration. This slight differential in sugar contents is necessary in order to prevent osmotic dehydration. This infusion continues until the fruit reaches saturation. At saturation, the liquid inside the fruit gels, firming the fruit so that the infused fruit has a firmness similar to the firmness of the raw fruit. Before infusion, the fruit may be initially processed to condition it for infusion. The initial processing of the fruit may include pressing it, to remove a desired quantity of juice, typically about 50–80% of the fruit juice. (The amount of juice removed may be that necessary to leave a soluble acid concentration substantially equal to that desired in the fully infused fruit.) In addition, care is exercised during processing to insure that the pressing does not substantially rupture the cells within the fruit. After the initial processing, the fruit is plumped up (or plumped) by replacing the juice which has been pressed out (or removed by other initial processing) with other fluids by immersing the fruit in a mixture of water, juice and sugar. After this step has been completed, the fruit is then infused in the manner set forth above.

Figure 1:
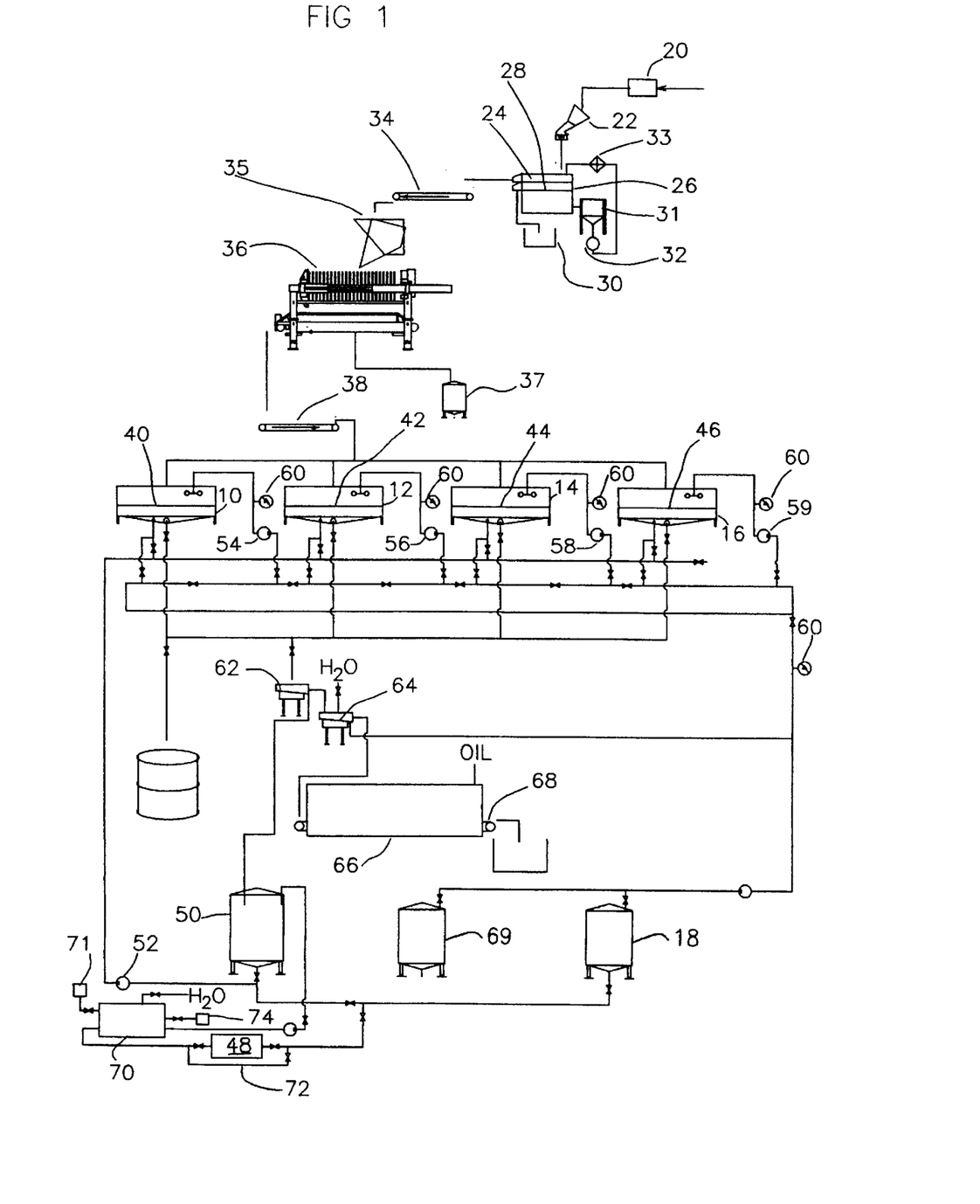
FIG. 1 is an overall process flowchart for cranberries.
Figure 3:
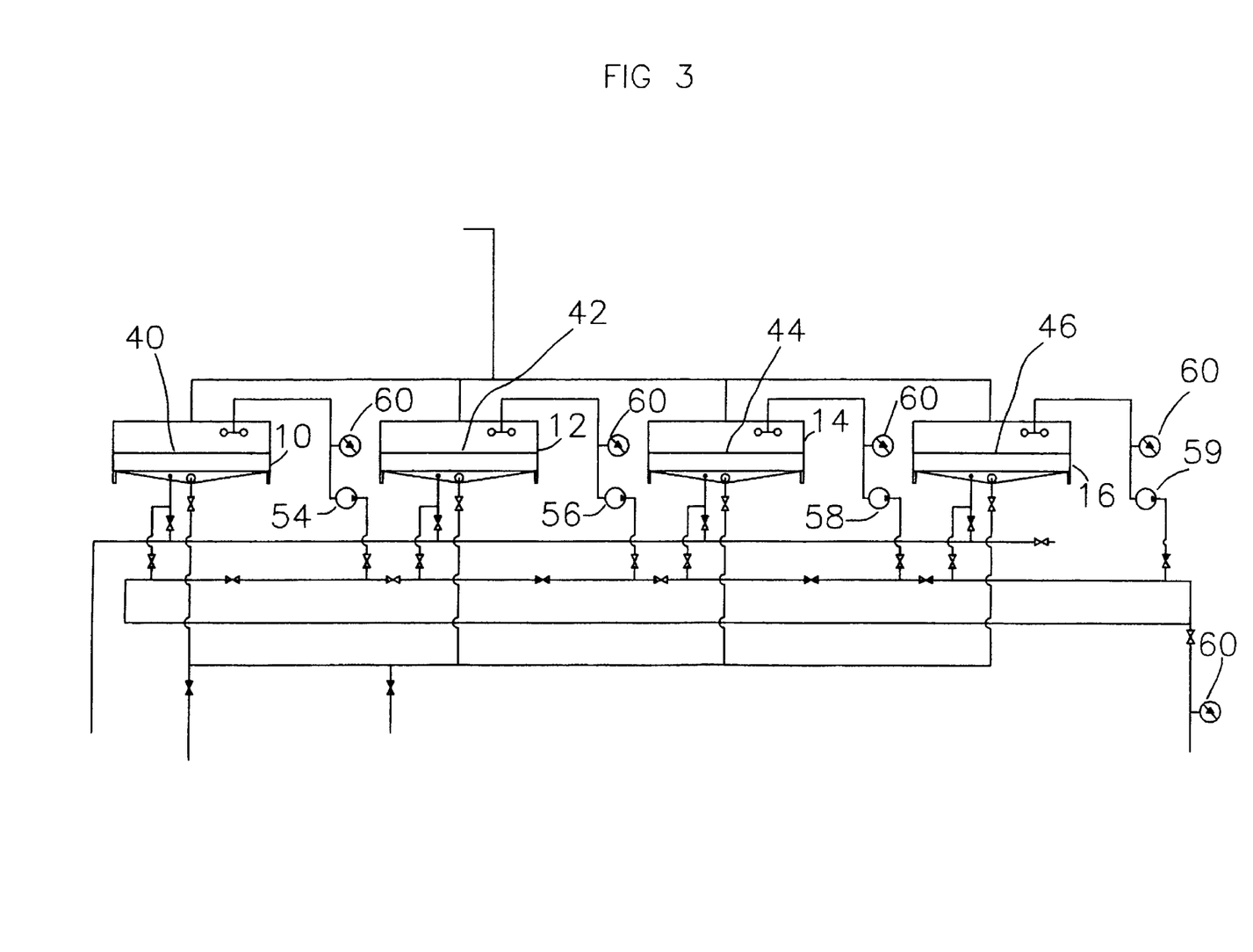

The operation of the process illustrated in FIG. 1 is a continuous batch process. As shown in FIGS. 1 and 3, four tanks 10, 12, 14, and 16 are used for infusing fruit, these tanks being interconnected with suitable plumbing to establish a flow path from tank 10 to tank 12 to tank 14 to tank 16 and back to tank 10. In addition, a bleed or overflow tank 18 is also provided. Fresh (which includes freshly processed) fruit is placed in the first tank in the series, and then fresh fruit is introduced sequentially in each subsequent tank in the series after suitable time intervals. Thus, at the beginning of a first time interval, fresh fruit is loaded into tank 10, at the beginning of a second time interval (which might be 6 hours later) fresh fruit is loaded into tank 12, and so on. Fresh fruit is always loaded into a tank just before it is processed to avoid premature spoilage of the fruit.

INITIAL PROCESSING

As the process may vary from fruit to fruit, the processing of cranberries will be described initially. Cranberries, which have been frozen in a conventional manner, are taken from the freezer and placed into a cold room 20 to temper to approximately −9.5° C. (15° F.). From the cold room, the still frozen cranberries proceed on a conveyor to an Urschel slicer 22, where they are sliced. (Any type of industrial slicer which will give a satisfactory product will do). After slicing, the still frozen cranberries are dropped onto the top screen 24 (FIG. 2) of a two screen vibratory separator 26. While in the separator, the cranberries are warmed to a higher temperature. To this end they are sprayed with a 65–71° C. (150–160° F.) warming liquid, (initially water, and then water mixed with cranberry juice). The seeds and other fines will be washed through the top screen 24, but not the second or bottom screen 28, and will be discharged from the bottom screen into tank 30 for subsequent disposal. The warming liquid passes through both screens 24 and 28 and is received in vessel 31. This liquid is then pumped via pump 32 into a heat exchanger 33 to raise its temperature back to 65–71° C. (150–160° F.) and is used again to spray further cranberries which have been discharged onto the screen 24. The flow of the warming liquid is preferably controlled in such a manner that there is neither net gain or loss of liquid, and the process is continuous.

Figure 2:
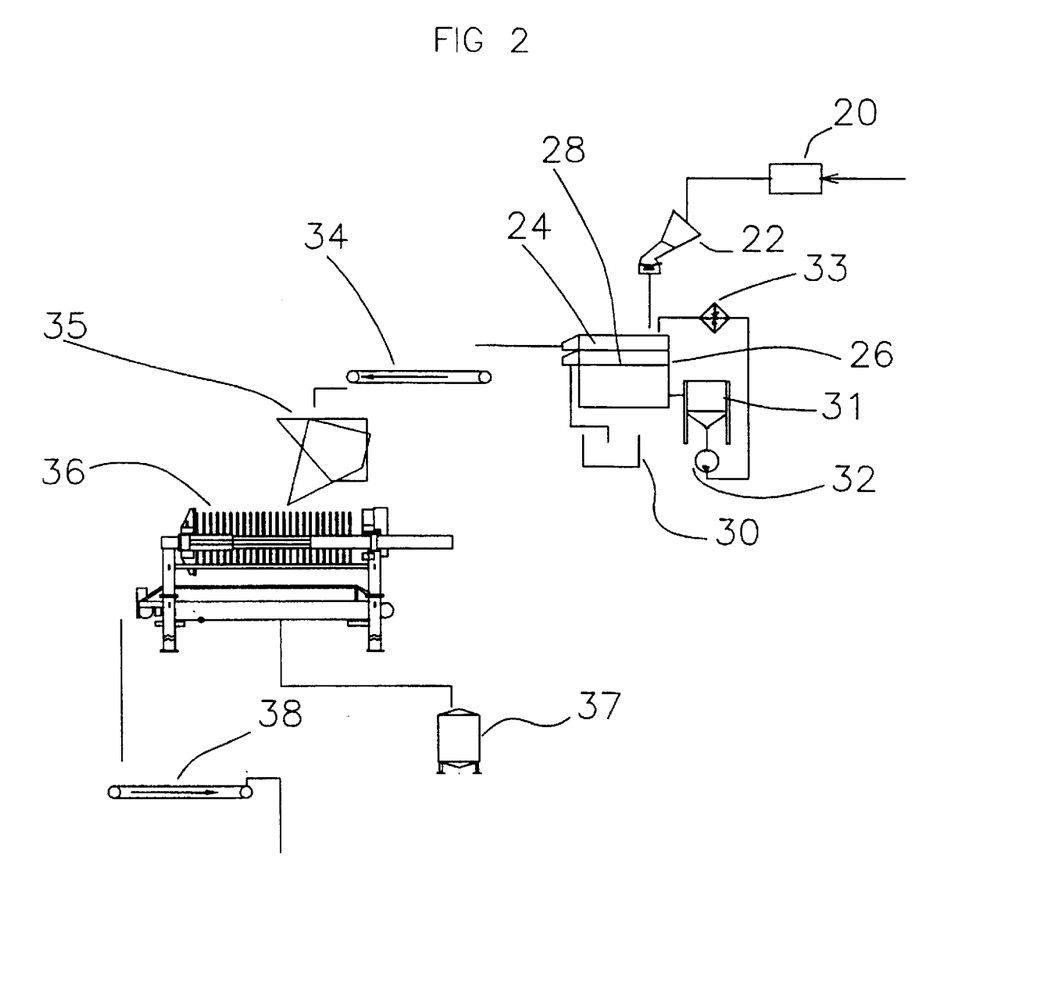
FIGS. 2–4 are enlarged details of portions of FIG. 1.

As the sliced cranberries leave the vibratory separator on conveyor belt 34, they are in a "semi-thawed" state. They are conveyed to a hopper 35 for holding until they can be transferred to a press 36 where they are pressed to extract approximately 50% of the juice by weight from within the cranberries. The press may be of the type shown in U.S. Pat. Nos. 4,892,665 or 5,275,097. The juice from the press is received in holding tank 37. The juice becomes a by-product of the process of this invention and may be used to make commercial fruit juices or other products that require fresh fruit juices. The press dumps the cranberries onto a further conveyor belt 38 which carries the cranberries to the infuser tanks.

START-UP PROCESSING

At start-up, and during a first time interval or cycle, the pressed cranberries move from the belt 38 to the first infusion tank 10 to a depth not greater than 61 mm (24 inches). (While cranberries can be layered up to 61 mm deep, some fruit require thinner layers. For example, sliced strawberries are infused best if the layers are not greater than 7.5 mm or 3 inches). A plumping liquid is also placed in the tank 10 so that the 61 mm deep product is fully submerged. (The tank may be 6–10 feet wide or wider). The plumping liquid may consist of pure fruit juice, or it may consist of a mixture of juice, water, and dissolved sugars, the sugar (including the sugars in the fruit juice) to water by weight ratio being at or slightly below the sugar content of the cranberries. For this discussion, it will be assumed that the sugar content of the cranberries is 8%, and therefore, the sugar to water weight ratio will be at or slightly below 8% (commonly referred to in the industry as Brix.) The berries are maintained in the 8 Brix plumping liquid for the first time interval to allow the cranberries to "plump" or take on water. Because the prime purpose of the infusion process is to replace fluids in the cranberries with sugar, this replacement of pressed-out juice during plumping becomes crucial. If plumping of cranberries is not done before infusion, the final product will not be satisfactory. After the tank 10 has been filled, the fruit is covered with a screen 40 which may be secured to tank 10 in any conventional manner. The screen secures the fruit within the tank and prevents it from floating downstream to the next tank with the flow of infusing liquor from one tank to the next.

During a second time interval or cycle, and while the berries are plumping further in tank 10, tank 12 is filled with fresh berries and a plumping liquid in the same manner that the tank 10 was filled. When tank 12 is filled with berries and the plumping liquid, it is covered with screen 42 (FIG. 3), and the contents in tanks 10 and 12 are allowed to plump for the remainder of the second time interval.

Figure 4:
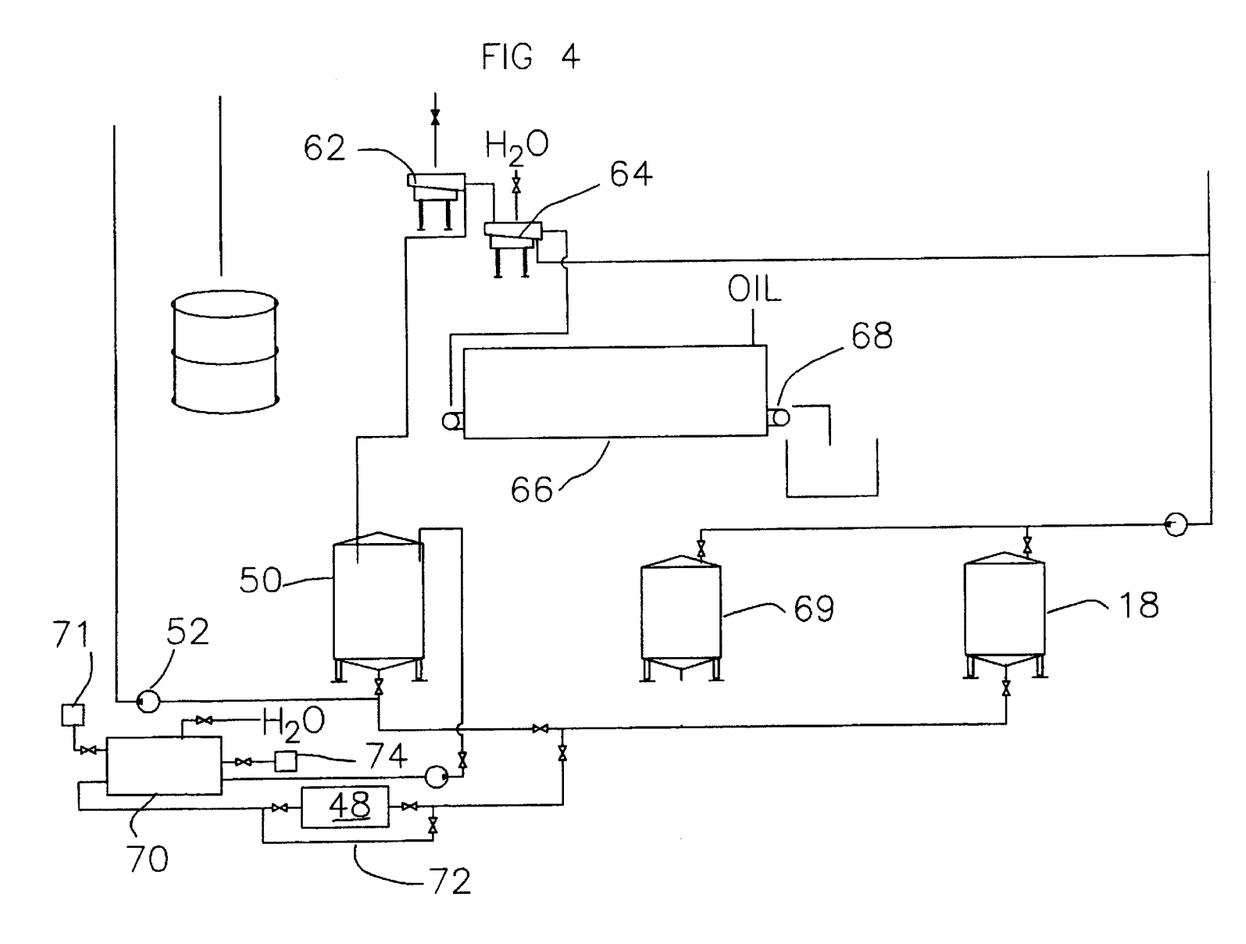

During a third time interval or cycle, fresh cranberries are placed into tank 14 and covered with screen 44. An infusing liquor, which consists of a fruit juice evaporated to 13 Brix via evaporator 48, and which has been fortified with additional sugar to bring it to 70 Brix, is now slowly introduced into the bottom of tank 10 from tank 50 by pump 52 (FIG. 4) to progressively infuse the berries from the bottom up. When the infusing liquor is introduced into tank 10, suitable valves are opened to permit plumping liquid to flow from tank 10 to the bottom of tank 12, and also to permit plumping liquid to flow from tank 12 into the bottom of tank 14. The flow from tank 10 to tank 12 is controlled by pump 54, and the flow from tank 12 to tank 14 is controlled by pump 56. (Pumps 58 and 59 are also provided to control flow from tank 14 to tank 16, and from tank 16 to tank 10, respectively.) As the front of the 70 Brix infusing liquor moves slowly up through the berries in tank 10, stratification of the infusing liquor will occur. Thus, the initial strata of the 70 Brix infusing liquor will be diluted as fruit juice leaves the fruit through osmosis, until the leading downstream strata is essentially pure fruit juice with a Brix just slightly greater than that of the fruit, for example just above 8 Brix if the fruit has a Brix of 8. Infusing liquor which has had its Brix reduced to that of the fruit is now considered to be a plumping liquid or juice product. Normally this full dilution of the infusing liquor will not occur in the first tank during the third time interval, but in the second or third tank during a fourth or fifth time interval, respectively. Succeeding strata of the infusing liquor (as measured in the upstream direction) will have progressively increasing Brix up to the initial Brix of the infusing liquor.

During a fourth time interval or cycle, the 70 Brix infusing liquor is still introduced into tank 10, and the plumping liquor in tank 14 is pumped via pump 56 into the bottom of tank 16 as fresh berries are introduced into tank 16 and held in place by screen 46. By the end of the fourth time interval, full, or substantially full, stratification of the infusing liquor has been achieved, and there will be no danger, or virtually no danger, of osmotic dehydration of the pressed fruit in tanks 14 and 16, as the stratified column of infusing liquor is caused to flow into these tanks, although there may have been some osmotic dehydration in tank 12, and there was osmotic dehydration to the berries in tank 10 during start-up. The batch process will now be continuously operated in the manner set forth below under the heading CONTINUOUS BATCH PROCESSING.

In order to better understand the above, it is best to consider the theory of operation for creating a stratified infusion liquor. After plumping, a sugar and juice solution of 70 Brix is pushed through the cranberries in tank 10 slowly, allowing each level of cranberries to come to an equilibrium concentration with the solution through diffusion. This process eventually, perhaps in 1½–2½ cycles, causes a stratified column of infusion liquor to be formed, with a 70 Brix strata on the bottom or upstream end of the column and a 8 Brix strata on the top or downstream end of the stratified column as the liquor is pushed through each successive layer of cranberries. This phenomenon may be examined in detail by examining a layer of cranberries having a thickness of one cranberry through each pass of infusing liquor. Before plumping, the cranberries are at a Brix of approximately 8–9. The plumping liquid is held at approximately 8 Brix.

The cranberries will reach an equilibrium concentration according to the following formula:

$$B_3 = \frac{B_1 \times W_1 + B_2 \times W_2}{W_1 + W_2}$$

where $B_1$=Brix of the liquid surrounding the fruit, $W_1$=weight of the liquid surrounding the fruit, $B_2$=Brix of the liquid within the fruit, $W_1$=weight of the liquid within the fruit, and $B_3$=Brix after equalization. After plumping is complete in tank 10 at start-up and the Brix calculated, the first layer of cranberries will have an 8.5 Brix concentration.

Next, the infusing liquor of 70 Brix is slowly introduced into the bottom of tank 10, and the first strata of 70 Brix infusing liquor contacts the first layer of cranberries for osmotic transfer. Using the above formula, the Brix of the first layer of cranberries increases to 38.75, and the Brix of the first strata will drop to 38.75. This infusion of the first layer will take a few minutes. The second strata of infusing liquor is now slowly introduced into the bottom of the tank to contact the first layer of cranberries, the first strata of infusing liquor being forced up into contact with the second layer of cranberries. The second strata also has an initial Brix of 70, so the Brix of the first layer of cranberries will be raised to 54.38. Meanwhile, the first strata, now at 38.75 Brix, will contact the second layer of berries. After infusion is complete in the second layer, the second layer will have a Brix of 23+, along with the first strata. This process repeats until the first layer and then each succeeding layer of cranberries reach saturation. Saturation occurs when the infusing liquor which has diffused into the fruit reacts with the pectin and the acid left in the fruit to form a gel. For cranberries, saturation and gel formation occurs at approximately 50–55 Brix. Exposure to 70 Brix infusing liquor after this point involves almost no osmotic transfer at the preferred operating temperature of 13–16° C. (55–60° F.). Thus, the process is preferably conducted at a temperature not in excess of 16° C. (60° F.), so that the fruit after infusion maintains the attributes of a fresh fruit, i.e., taste and color. During the infusion process, the sugar from the infusion liquor replaces the juice in the cranberries in an almost one to one ratio as evidenced by the above formula. However, above 55 Brix, the juice in the fruit is increasingly tied up in a gel, so the process of osmotic transfer slows down. At saturation, where the sugars, acids, and pectin within the fruit form a gel, the fruit will not slump if removed from the liquor. Thus, after a tank of berries has been fully infused during this continuous batch process, typically the cranberries in the tank to be dumped are at about 55 Brix, while the infusing liquor is at or near 70 Brix.

The stratified column of infusing liquor passes through all of the cranberries in tank 10 and proceeds through tanks 12, 14, and 16. Each tank holds approximately 24 inches of cranberries below the screen, plus an additional reservoir of fluid above the screen. The cranberries, for example in tank 14, reach saturation after three cycles of plumping and infusing, about 18 hours. Although cranberries reach saturation at 55 Brix, the Brix of the infusing liquor is preferably 70 Brix, since a 70 Brix solution will not spoil over an extended period of time. After infusion is completed in any tank, the cranberries are removed from the tank for further processing.

CONTINUOUS BATCH PROCESSING

During continuous operation, differing aspects of the invention are occurring simultaneously in each of the respective tanks. After start-up, during the continuous batch processing, the stratified liquor which is used to treat the fruit has a length of about 1½ tanks. For example, at the beginning of cycle n, fruit in tank 10 has become substantially fully saturated, and tank 10 is ready to be emptied. At this time the infusing liquor in tank 10 is at 70 Brix, and in the next 1½ tanks (12 and 14) it is stratified. Thus, the sugar concentration in the bottom of tank 12 is 70 Brix, and the sugar concentration at the top of tank 12 is in the range of 25–30 Brix. At this time the infusion liquor in the bottom half of tank 14 is partially stratified, the sugar concentration in the bottom being 25–30 Brix, and this stratification continues to about midway up the tank, where the Brix content drops to about 8. As the infusion liquor in the top half of tank 14 is at 8 Brix, having given up its excess sugar, it can be considered as plumping liquid. Similarly, at this time, the liquid in tank 16, the last tank in the series, is at 8 Brix, which 8 Brix solution is used to plump the fruit in tank 16.

During cycle n, which may be as long as 6 hours, tank 10 must be isolated from the flow of infusion liquor, it must be dumped, and it must be refilled with fresh cranberries and plumping liquid, the fresh cranberries being secured in place with screen 40. Initially, during a first time period of cycle n, tank 10 is isolated from the other tanks 12–18 by closing off suitable valves (not numbered). During this same time period, flow from the infusion liquor tank 50 is directed to the bottom of tank 12 by opening a suitable valve. In addition, the flow from tank 16 is directed to overflow tank 18 by opening a suitable valve. These valves may be manually operated, or they may be solenoid operated. At the conclusion of the first time period of cycle n, infusing liquor will be pumped into tank 12, and plumping liquid will be pumped into overflow tank 18. The flow rate of pump 50 is adjusted to maintain the length of the stratified column to 1½ tanks. To this end, refractometers 60 are provided in the fluid lines which convey infusing liquor from the top of one tank to the bottom of the next tank, the refractometers measuring the Brix of the liquor as it exits a tank. If the Brix is too high, pump 50 is slowed up. If the Brix is too low, the output of pump 50 is increased.

Once tank 10 has been isolated and flow has been established through tanks 12 to 18, during a second time period of cycle n, the cranberries and infusing liquor surrounding the berries in tank 10 are dumped for further processing in the manner set forth below. During a third time period in cycle n, tank 10 is refilled with fresh cranberries and plumping liquid from overflow tank 18. In addition, the berries are secured in place with screen 40. With a pressed fruit, such as cranberries, the juice (or plumping liquid) absorbed during plumping may be substantially equal to the juice (or plumping liquid) driven off during the infusion process.

During the next cycle n+1, tank 12 is isolated, the output from tank 16 is connected to tank 10, and the output from 10 is connected to overflow tank 18 during a first time period. Tank 12 will now be dumped and refilled in the same manner as tank 10.

From the above discussion, the continuous operation may be generalized as follows. At any given time, during continuous operation, one tank in the process will be isolated out of the cycle for emptying and refilling. The tank immediately downstream of the isolated tank will be receiving only pure 70 Brix infusing liquor, and the fruit within it will be approaching saturation. A third tank, which is immediately downstream of the second tank, will be receiving stratified liquor pumped from the second tank. Finally, a fourth tank, which is immediately downstream of the third tank, will be receiving only low Brix plumping liquid pumped from the third tank, and will cause the fruit within that tank to become plumped. Excess fluid from the most downstream tank will be pumped into the holding tank 18 until it is used later on. While 70 Brix has been used in the example set forth above, the infusion liquor could be at other Brix, for example 72.

FURTHER PROCESSING

The cranberries and infusion liquor dumped from one of the processing tanks 10–16 may now be separated by use of a vibratory separator 62. The infusion liquor separated from the cranberries are sent back to tank 50 and is reused as pure 70 Brix infusion liquor. The berries which leave screen 62 are washed on a vibratory screen 64, and then are suitably dried by a drier 66 to a water activity level suitable for long term shelf storage life. Water activity is determined from the following formula: $A_w=P/P_0$, where P is the partial pressure of water in the product, and $P_0$ is the vapor pressure of water at the given temperature. It has been found that there is no yeast, mold, or bacteria growth when the water activity is below 0.65, and that there is very little enzyme activity when the water activity is below 0.5. Therefore, water activities in the range 0.64–0.40 are desirable for good storage life of the product. (See JOHN T. NICKERSON and ANTHONY J. SINSKEY, *Microbiology of Foods and Food Processing*, 1972, pp. 71–83, American Elsevier Publishing Company, New York.)

The drying should be done at a temperature sufficiently low so that most aromatics remain with the fruit. To this end, the cranberries are sent from the washer 64 to a conveyor 68 which passes through a dryer 66. The drying process occurs by passing heated air over a thin layer of cranberries laid on the conveyor belt. In one embodiment, a SANDVIK model 2 dryer system is used. During the drying process, the cranberries shrink slightly but the temperature is low enough to keep the cranberries' natural aromatics inside the cranberries. The drying process contains at least three drying stages. In the first stage, the cranberries are dried from a moisture content of approximately 55% to a moisture content of approximately 38% by drying for approximately 40 minutes. The air temperature for the first stage is 95–105° C. (203–221° F.). After the first stage, the cranberries are mixed, equilibrated, re-doubled, and sent to stage two. During stage two of the drying process, the air temperature is 80–95° C. (176–203° F.) and the moisture content is further reduced to 23% by drying for approximately 80 minutes. After the second stage, the cranberries are mixed, equilibrated, and sent to stage three. Stage three air temperature is 75–80° C. (167–176° F.). and the moisture content is reduced to its final value of 13% by drying in stage three for approximately 80 minutes. At this resultant moisture content, the water activity of the cranberries is approximately 0.45–0.49 at room temperature. This drying process produces cranberries that possess uniformity in size and a good appearance. After drying, the cranberries are lightly misted with sunflower oil to keep the cranberries from sticking to each other or to other products with which the cranberries may be mixed. These cranberries are the final dried product and can now be used with a stable shelf life.

OTHER SPECIFIC FRUIT PROCESSING

The present invention infuses many different types of fruit in addition to cranberries. While specific fruits are discussed below, the invention is not limited to the specific fruits set forth in this application.

Blueberries can be processes in two ways. If desired the blueberries may be frozen and stemmed. Then the frozen blueberries are placed directly into a first tank of the series of four interconnected tank for plumping and then infusion. Blueberries have a natural Brix content of 12 to 15 Brix so the plumping liquid is concentrated to the natural Brix content of the blueberries, and is warmed to slightly thaw the blueberries. After the blueberries have been plumped, they are infused in the same manner as cranberries. The infusion liquor is formed from suitably concentrated blueberry juice, water, and sugar, and/or citric acid, the blueberry infusion liquor also being at 70 Brix. If desired, fresh blueberries may be infused. To infuse fresh blueberries, the skin of the blueberry must be pierced after the blueberries are stemmed. The blueberries are then placed directly into infusion process tank without squeezing, and are infused to saturation which is about 58 Brix. In this process, as there is no preliminary squeezing, blueberry juice is extracted from the fruit during the infusing process. Thus, after start-up, a column of substantially pure fruit juice will precede the stratified column which is common to all of the fruits mentioned below which do not require squeezing as a step in the initial processing. Part of this column of substantially pure juice is apportioned off to the juice tank 69 for further juice processing in the place of the juice which is squeezed from other fruits like cranberries. This juice can be used to make commercial fruit juices or other products that require fresh fruit juices. The remaining portion of the fruit juice is recirculated as the plumping liquid be being pumped to the plumping tank 18 and sent through the infusion tanks. After infusion, the berries may be suitably dried to the desired water activity level, in the same manner as cranberries. Alternatively, the blueberries can be packages as a final product directly from the infusion tanks.

Strawberries are frozen and then tempered to approximately −9.5° C. (15° F.). The natural Brix of strawberries has a wide range , typically within the range of 8 to 15 Brix, depending upon the source of the strawberries, and how ripe they were when picked. (This is typical for virtually all fruits. In this connection it is best to measure the Brix of the fruit before making up the plumping liquid.) The plumping liquid is concentrated to match the natural content of the strawberries and the solution is warmed to continue thawing the strawberries slightly. The strawberries are infused to approximately 62 Brix. If desired, the strawberries may be sliced and/or diced after tempering and before infusion.

Raspberries are frozen and then placed into an infusion process tank. Raspberries are not squeezed. Raspberries have a natural Brix content ranging from 10 to 12 Brix. The plumping liquid is concentrated to approximately 10 to 12 Brix and warmed so as to thaw the raspberries slightly. The raspberries are infused to saturation, approximately 62 Brix.

Cherries are frozen and pitted and the skin is broken. No squeezing is performed on the cherries. The cherries are placed directly into the infusing process. Cherries have a natural Brix content of 14 so the plumping liquid starts at 14 Brix. Since the cherries are frozen when placed in the infusing process, the plumping liquid is warmed to slightly thaw the cherries. The cherries will be infused to approximately 55 Brix. Fruit juice will be produced in the same manner as blueberries, and the resulting product may also be suitably dried.

Grapes are squeezed and then infused. This infusion process produces a raisin that is sweeter and less chewy than raisins produced in the normal manner.

Apples are processed by slicing raw (but not frozen) apples very thin and squeezing the apple slices so that 40–50% of the juice is extracted. The apples are then placed in one of the infusion process tanks and infused. Apples have a natural Brix content of 12 so the plumping liquid is concentrated to approximately 12 Brix. The apples are infused to saturation and may be suitably dried to the desired water activity level.

Peaches are processed in a manner similar to apples with a few distinctions. Raw peaches are sliced thin and squeezed. Then the peach slices are infused. Peaches have a natural Brix content of 12. The peaches are infused to approximately 55 Brix.

The present invention has also been shown to work well with vegetables like broccoli, celery and carrots. The broccoli and celery are diced and then infused. The Brix content of natural celery is 7 or 8. The Brix content of natural broccoli is 5 or 6. Celery is infused to approximately 30 Brix and broccoli is infused to approximately 40 Brix. Infused celery and broccoli are suitable for use in stuffing.

INFUSION LIQUOR MAKEUP

The infusing liquor is initially made in mixer 70 from sugar syrup received from tank 71 and fruit juice either received from evaporator 48 where it is evaporated up to the desired starting Brix, or from evaporator bypass. When making up the liquor for cranberries, it is necessary to evaporate the 8 Brix juice in order to have soluble acid and a concentration of pigments which equal the concentration of the soluble acid and pigments desired in the finished product. However, with other fruit, for example blueberries, as the Brix of the juice is relatively high, and because it is not necessary to concentrate for pigment and soluble acid, the juice may be received directly from the overflow tank 18 via evaporator bypass 72. Because the pressed juice may contain soluble pectin, the infusing liquor may turn into a gel. To prevent gelling of the infusing liquor, the juice may be initially treated with pectinase from conditioner tank 74. Infusion liquors for other fruit may require the addition of other conditioning agents, such as citric acid for blueberries.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. While the invention was developed for infusing fruits, as noted above it may also be used with other vegetable products. Therefore, the term fruit as used in the following claims should be interpreted to include other vegetable products, such as celery, carrots, and/or broccoli.

What is claimed is:

1. A process for infusing fruit with sugar and for obtaining substantial juice by-products, the process comprising the following steps:
    (a) preliminarily processing the fruit prior to step (b) to make the fruit receptive to infusing, the fruit being pressed during the preliminary processing and wherein fruit juice is extracted and collected from the fruit during pressing;
    (b) placing the preliminarily processed fruit in a tank to form a bed of fruit;
    (c) plumping preliminarily processed fruit, after it has been placed in the tank, by replacing the extracted fruit juice with a fluid to plump the fruit to the same or nearly the same volume it had before the fruit juice was extracted from the fruit
    (d) progressively subjecting the bed of fruit to strata of infusing liquors of progressively higher sugar content to cause osmotic transfer of sugar from the infusing liquors into the fruit and to cause osmotic transfer of fruit juice from the fruit into the infusing liquors, this step being performed at a temperature preferably of not more than 38° C. and at a rate sufficiently slow so as to prevent osmotic dehydration of the fruit, the liquors moving upwardly through the fruit; and (e) subsequently further processing the fully infused fruit.

2. The process as set forth in claim 1 wherein the fruit to be infused is apples, the process including the steps of slicing and pressing the apples to extract about 40–50% of the apple juice prior to step (b), and infusing the pressed and sliced apples in a plumping liquid having a Brix at about the same or slightly less than the apples.

3. The process as set forth in claim 1 wherein the fruit to be infused is cranberries, the process including the steps of freezing, tempering, and slicing the cranberries prior to step (b) and infusing the pressed cranberries in a plumping liquid having a Brix at about the same or slightly less than the cranberries.

4. A method according to claim 1 wherein a plurality of tanks interconnected in series are provided, and step (b) includes placing successive batches of fruit in successive tanks in the series, all batches of the fruit being in the flow path of the infusing liquid, such that, when the infusing liquid has moved through the flow path beyond the batch of fruit in each tank but the last in the series, that part of the infusion liquid beyond such batch is transferred into the next successive tank in the series in such a manner as to maintain a flow rate not substantially greater than the rate of infusion of sugar from the infusion liquid into the fruit.

5. A method according to either claim 2 or 1 wherein the further processing of the fully infused fruit includes drying the infused fruit to a sugar concentration falling within a range of from about 70 Brix to about 88 Brix.

6. A method according to claim 5 wherein the dried infused fruit has a water activity level ranging from about 0.50 to about 0.65.

7. A method according to claim 5 wherein the infused fruit is collected in step (e) when the concentration of sugar within the fruit is at a concentration ranging from about 30 Brix to about 62 Brix.

8. A method according to claim 1 further comprising securing the batch of fruit within the tank so as to prevent the fruit from migrating along the direction of flow.

9. A method according to claim 8 wherein the securing is done by placing a screen over the batch of fruit.

10. A method according to either claim 2 or claim 1 wherein fruit juice is collected from the most downstream portion of the infusion liquor and is further prepared for reuse as an infusing liquid for a subsequent batch of fruit.

11. An infused fruit made in accordance with either claim 2 or claim 1.

12. A method for infusing fruit with sugar and for producing a fruit juice product comprising the following steps:

pressing the fruit to extract fruit juice from fruit, the extracted fruit juice being collected for further processing;

plumping the pressed fruit from which fruit juice has been extracted with a plumping liquid containing fruit juice and sugar, the sugar content of the plumping liquid being nearly the same as the sugar content of the pressed fruit;

infusing the plumped fruit by passing a stratified column of infusing liquor from the bottom up through the fruit at a flow rate not substantially greater than the rate of infusion of sugar from the infusion liquor into the fruit, the stratified infusion liquor having progressively increasing sugar content, the initial strata having about the same sugar percentage as that of the sugar content of the plumping liquid, this step being performed at a temperature preferably of not than 38° C. and at a rate sufficiently slow so as to prevent osmotic dehydration of the fruit; and subsequently further processing the fully infused fruit.

13. A method according to either claim 12 or claim 1 wherein the successive strata are maintained along the flow path during the infusion step so that substantial mixing of strata of differing sugar concentrations is avoided.

14. A method according to either claim 12 or claim 1 wherein the infusing liquor includes a soluble acid concentration substantially equal to that desired in the fully infused fruit.

15. A method according to either claim 12 or claim 1 wherein the infusing is conducted at a temperature of not more than about 16° C. (60° F.).

16. An apparatus for infusing fruit with sugar and for obtaining a substantial juice by-product, the apparatus comprising:

conditioning means to condition the fresh fruit for infusing, the conditioning means including a press capable of squeezing out up to 50–80% of the fruit juice from the fruit;

fruit juice collecting means (37) for receiving the fruit juice pressed from the fruit;

a plurality of fruit receiving tanks (40, 42, 44, 46) capable of receiving fruit to be infused;

plumbing means interconnecting the tanks to establish a flow path from the top of one tank to the bottom of the next tank;

an infusion liquor tank (50) for infusion liquors; and pumping means (52) to pump infusion liquors from the liquor tank to subject layers of fruit within the fruit receiving tanks to strata of infusing liquors of progressively higher sugar content to cause osmotic transfer of sugar from the infusing liquors into the fruit and to cause osmotic transfer of fruit juice from the fruit into the infusing liquors, the pumping means operating at a rate sufficiently slow so as to prevent osmotic dehydration of the fruit, the infusion liquors moving upwardly through the fruit within each fruit receiving tank.

17. The apparatus as set forth in claim 16 further including a bleed tank for receiving plumping liquid, and means to retrieve fruit juice from the plumping liquid after it has been received within the bleed tank.

18. The apparatus as set forth in claim 16 further including drying means (66) capable of drying the fruit to a water activity below 0.65 and at a temperature sufficiently low so that most of the aromatics remain inside the fruit.

* * * * *

UNITED STATES PATENT AND TRADEMARK OFFICE
CERTIFICATE OF CORRECTION

PATENT NO.   : 6,159,527
DATED         : December 12, 2000
INVENTOR(S)  : Dale E. Wettlaufer It is certified that error appears in the above-identified patent and that said Letters Patent is hereby corrected as shown below:

Claim 1,
Line 15, after "fruit" insert -- ; --.

Claim 5,
Line 1, change "2" to -- 12 --.

Claim 7,
Line 2, change "step (e)" to -- the final step --.

Claim 10,
Line 1, change "2" to -- 12 --.

Claim 11,
Line 2, change "2" to -- 12 --.

Claim 12,
Line 19, change "of not than" to -- of not more than --.

Signed and Sealed this

First Day of January, 2002

Attest:

Attesting Officer

JAMES E. ROGAN
*Director of the United States Patent and Trademark Office*